United States Patent Office 3,191,385
Patented June 29, 1965

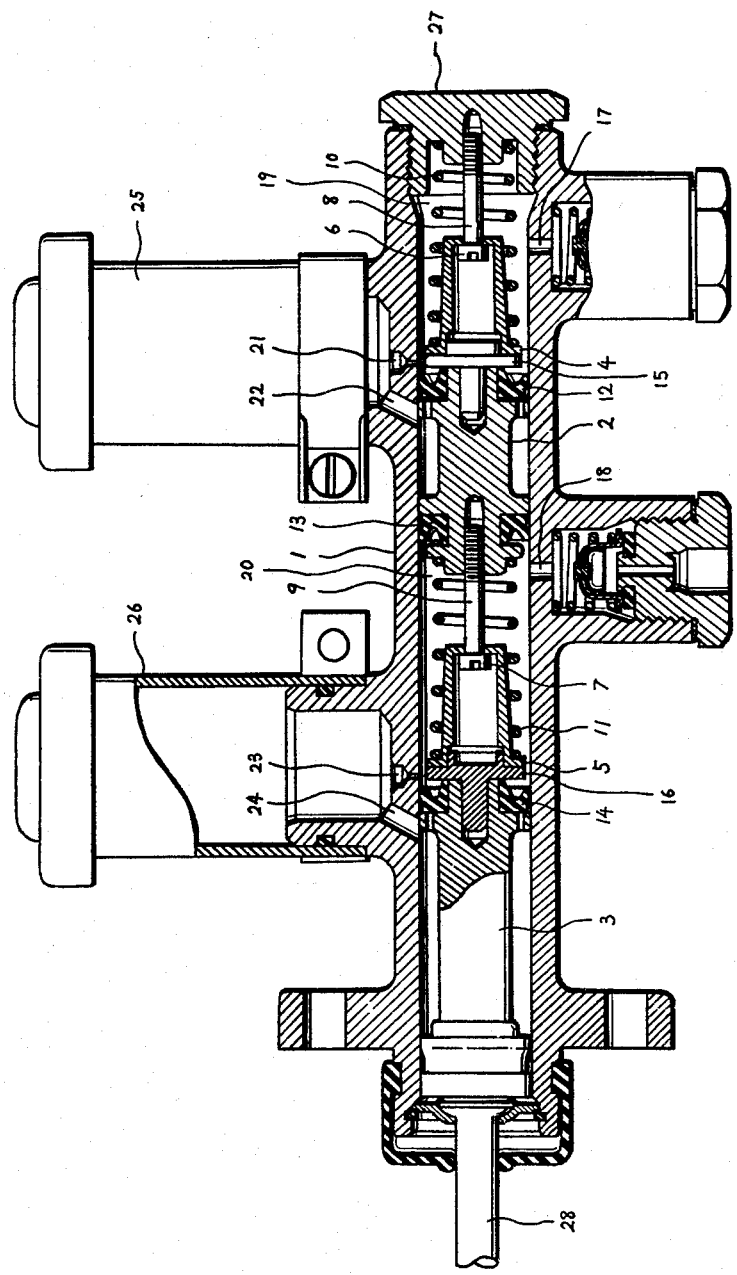

3,191,385
DUAL SUSPENSION TANDEM MASTER CYLINDER
Mamoru Watanabe, 16 6-chome, Takinogawa-machi,
Kita-ku, Tokyo, Japan
Filed Sept. 27, 1963, Ser. No. 312,047
3 Claims. (Cl. 60—54.6)

This invention relates to a tandem brake master cylinder of a brake control system for motor vehicles, etc., which have front and rear brake systems, and more particularly to a tandem brake cylinder which has two fluid pressure pistons in one cylinder for transmitting the fluid pressure independently and separately to the front and rear brake systems.

The tandem brake master cylinder, according to the invention, is provided with a primary and a secondary piston in one cylinder. The secondary piston, located substantially at the center of the cylinder, separates the cylinder into two systems for transmitting independently and separately fluid under pressure. The secondary piston has a floating action, so as to equalize the pressures in the two separated systems in the cylinder. Accordingly the master cylinder can simultaneously transmit fluid with equal pressure to the two separated brake systems and can transmit fluid under pressure without any trouble, even when one system has lost pressure due to a fluid pressure leak. From its very function, the secondary piston can be called a floating piston.

The amount of pressurized fluid necessary for operating the two systems of the brake connected from the tandem master cylinder is determined by the piston stroke of each of the two pistons. In this case, the amount of operating fluid is determined by the position of the floating piston located at the center of the cylinder and the front and back displacements of that piston. In other words, the amount of operating fluid for the two valves of the tandem master cylinder is determined by the position of the floating piston, that is, the position when the brake is returned to its non-operating position (return-stop position). Accordingly, the tandem master cylinder, which requires perfect functioning since it is the most important safety mechanism of the vehicle, is incapable of performing its function unless the return-stop position of the floating piston is set so as to maintain constantly invariable piston strokes.

An object of the invention is to provide a tandem brake master cylinder that insures high stability, durability and productivity as a mechanism completely meeting the above conditions.

This object is satisfied by providing the master cylinder with two suspension mechanisms to restrict the floating action of the floating piston mutually in opposite directions and to release this restriction only when the brake is applied, to give it a floating action.

In the case of already known master cylinders, the motion of the floating piston is restricted by a single holding point or a single suspension mechanism. This motion-restricting mechanism gives the floating piston the freedom to move to the other unrestricted direction. To offset this mobility of the floating piston and set its predetermined return-stop position, return springs are inserted in the front and back of the floating piston and have a spring load distribution offsetting this mobility. In other words, in determining the return-stop position of the floating piston by a restricting mechanism, the load distribution of the return spring becomes strong in the front and weak in the back of the piston for backward motion of the floating piston; on the other hand, it becomes weak in the front and strong in the back of the piston for forward motion, making it impossible to obtain constantly an invariable original load or tension from variable materials which are moving flexibly in regard to the load distribution of the two springs.

In the case of a single suspension system, therefore, only one determination can be made for the load distribution of the return springs in front and back of the floating piston. Further, because the mobility of the floating piston cannot be offset when the load distribution becomes unbalanced, the floating piston loses its predetermined return-stop position. As a result, the gaps in front and back of the floating piston, that is, the piston stroke of each of the two pistons change, making impossible the obtaining of a predetermined amount of the operating fluid.

Briefly, the invention contemplates a mechanism which will restrict the mobility of the floating piston of the single suspension system to the front and back directions by means of two suspension mechanisms made of invariable materials, and place the floating piston at the return-stop position to obtain the predetermined amount of fluid when the brakes are released, regardless of the load distribution of the return springs placed in front and back of the floating piston and permit floating action to obtain uniform fluid pressure when only the brakes are applied.

Other objects, features and advantages of the invention will be apparent from the following detailed description when read with the accompanying drawing whose sole figure shows a schematic sectional view of a dual suspension tandem master cylnider in accordance with the invention.

Referring to the sole figures, the tandem master cylinder 1 comprises, primarily, a primary piston 3, a secondary piston 2, and two suspension mechanisms comprising respectively connecting screws, 9, 8, the screw heads 7, 6, stoppers 5, 4, stopper seats 16, 15 and primary and secondary oil chambers 20, 19 disposed in the cylinder body 1.

Primary oil chamber 20 is connected via an outlet 18 to one wheel braking system and via port 23 to primary oil reservoir 26 which has a compensating port 24. Secondary oil chamber 19 is connected via port 21 to secondary oil reservoir 25 which has a compensating port 22.

The primary stopper seat 16 of the suspension mechanism in primary oil chamber 20 has its seat end inserted in the stopper 5 and the other protruded end inserted in the primary piston 3; seat 16 serves as a retainer for a piston cup 14 and a seat of stopper 5. Since the stopper seat 16 connects the stopper 5 and the primary piston 3 by insertion of its ends into them, stopper 5 has the same center line of direction of motion as that of primary piston 3. This brings about a smooth sliding motion of the stopper 5 along the connecting screw 9, in response to the stroke of the primary piston 3.

A primary return spring 11 is set between the secondary piston 2 and stopper 5 with a fixed load set by connecting screw 9 whose one end is screwed into the secondary piston 2 and whose other end is slidably connected to the stopper 5 by means of a screw head 7. Connecting screw 9, by having it s length fixed, sets the fixed load of return spring 11 and the gap between stopper 5 and secondary piston 2. Even if the load of the primary return spring 11 increases, the gap between stopper 5 and secondary piston 2 can never increase. Accordingly, only an approaching motion or decrease in the gap between stopper 5 and secondary piston 2 is permitted.

A secondary oil chamber 19 contains a similar suspension mechanism as is contained in the primary oil chamber 20. The secondary return spring 10 has its fixed load set by the stopper 4, connecting screw head 6 of connecting screw 8 and header nut 27. The connecting screw 8 fixes the interval between stopper 4 and header nut 27. A secondary stopper seat 15, having the same function as that of the primary stopper seat 16, connects the secondary piston 2 and the stopper 5 on the same center line, bringing about, as a result thereof, a smooth sliding motion of stopper 4 along the connecting screw 8 in response to the stroke of secondary piston 2. In this case, too, only the approaching motion or decrease in the gap between the stopper 4 and the header nut 27 is permitted.

When the primary piston 3 of this dual suspension tandem master cylinder having two suspension mechanisms is at the return-stop position at the end of the cylinder and the brake is released, that is, when it is at the position shown in the drawing, return spring 11 is set between the primary stopper 5 and the secondary piston 2 and return spring 10 is set between the secondary stopper 4 and the header nut 27 at the maximum gaps permitted by the connecting screws 9 and 8 respectively. In this case, since the two suspension mechanisms offset the direction of motion permitted the secondary piston, in other words, since only an approaching motion is permitted between the primary stopper 5 and the secondary piston 2 in the primary oil chamber 20 and between the secondary stopper 4 and the header nut 27 in the secondary oil chamber 19, the secondary piston 2, located between the header nut 27 fixed to the cylinder body 1 and the primary piston 3, stopped at the opposite end of the cylinder is stopped, having lost its mobility. It cannot move forward or backward.

If the return-stop position of the secondary piston 2 is set, utilizing this principle the predetermined amount of pressurized fluid from the piston stroke of each of the pistons 3 and 2 can be obtained because the front and back gaps of the piston do not change.

Further, if this principle is utilized, the connection of the primary stopper 5 and the connecting screw 9, even if there should be an increase in the load of the primary return spring 11, or even if there should be a decrease in the load of the secondary return spring 10, does not permit forward motion beyond the maximum gap between the secondary piston 2 and the stopper 5 fixed by means of the connecting screw 7. In the same manner, the connection of the secondary stopper 4 and the connecting screw 8, even if there should be an increase in the load of the secondary return spring 10, or even if there should be a decrease in the load of primary return spring 11, does not permit backward motion beyond the maximum interval between the secondary piston 2 and the header nut 27 as fixed by the connecting screw 8. It is, therefore, possible to select at will the load distribution of the two springs, and even if the load distribution is lost, there will be no change whatsoever in the piston stroke.

When the brake is applied by pressing on the brake pedal push rod 28 of this dual tandem master cylinder, the primary piston 3 moves forward, toward the right in the drawing. Accompanying this motion, stopper 5 slides along the connecting screw 9 approaching the secondary piston 2 and the screw head 7 advances into the stopper 5 and this suspension mechanism releases the restriction on piston 2. Fluid pressure is produced in the primary oil chamber 20 when piston cup 14 fitted to the primary piston 3 passes the primary pressure return port 23 of primary oil reservoir 26; this fluid pressure forces forward secondary piston 2 to produce the equal or same fluid pressure in the secondary oil chamber 19. The forward motion of secondary piston 2 is permitted by the stroke of the primary piston 3, because the suspension mechanism in the primary oil chamber 20 is in the restriction-release position.

Fluid pressure is produced in secondary oil chamber 19 when piston cup 12, fitted to the secondary piston 2, passes the secondary pressure return port 21 of secondary oil reservoir 25, and the secondary stopper 4 slides along connecting screw 8 and approaches header nut 27. The screw head 6 advances into stopper 4 and, as a result, this suspension mechanism also releases the restriction. At this point, the secondary piston 2, whose motion had been held in check by the two suspension mechanisms, is now able to engage in a floating action forward and backward and equalize the fluid pressures of the primary and secondary oil chambers 20 and 19.

Operation of the master cylinder in the case of a fluid pressure leak in one of the two systems, will now be described. When a loss of fluid pressure occurs in the primary oil chamber 20, the primary piston 3 makes an ineffective stroke until stopper 5 reaches secondary piston 2 and the push rod 28 is pushed further, forcing secondary piston 2 forward to produce fluid pressure in secondary oil chamber 19. When a loss of fluid pressure occurs in the secondary chamber 19, the secondary piston 2 makes ineffective strokes while maintaining the same interval, until the secondary stopper 4 reaches the header nut 27 and the push rod 28 is pushed further, forcing the primary piston 3 forward to produce fluid pressure in the primary oil chamber 20.

As has been explained, this invention, by providing with two suspension mechanisms, checks or restricts the floating action of the secondary piston; that is, of the floating piston. In the drawing, the primary connecting screw 9 is screwed to the secondary piston 2 and the secondary connecting screw is screwed to the header nut 27. Even if these are screwed in the reverse direction, the apparatus according to the invention still operates, because the motion of the floating piston can be restricted to the offsetting direction.

I claim:

1. A tandem master brake cylinder apparatus for use with first and second brake systems, comprising a cylinder including first and second end walls, a brake rod extending through said first end wall and adapted for movement in a forward direction towards said second end wall and a rearward direction away from said second end wall, a first piston within said cylinder connected to said brake rod, a floating piston in said cylinder disposed in the region between said first piston and said second end wall, the region between said first piston and said floating piston within said cylinder defining a first fluid chamber, the region between said floating piston and said second end wall defining a second fluid chamber, a first port in said cylinder in the region of said first fluid chamber for connecting said first fluid chamber to said first brake system, a second port in said second fluid chamber for connecting said second fluid chamber to said second brake system, a first suspension means, including spring means, operatively coupling said first piston to said floating piston, and a second suspension means substantially identical to the first suspension means and including spring means operatively coupling said floating piston to said second end wall, said first and second suspension means cooperating to prevent rearward movement of said floating piston until said brake rod is moved from its initial rearward position and then to permit movement of said floating piston in both a forward and a rearward direction, said first suspension means including a first spring disposed between said first piston and said floating piston for urging them apart and first slidable stop means between said first piston and said floating piston for limiting the separation therebetween, said second suspension means including a second spring disposed between said floating piston and said second end wall for urging said floating piston away from the latter said end wall and second slidable stop means between said floating piston and said end wall for limiting the separation therebetween, said first and second stop means being axially aligned in said cylinder and respectively acting on said floating piston to maintain the same in an initially preestablished and fixed rearward position in the cylinder.

2. The tandem master brake cylinder apparatus of claim 1, wherein said first slidable stop means includes a first apertured collar means secured to said first piston and a first connecting screw having a head, said first connecting screw freely passing through the aperture of said first apertured collar means with said head abuttable against a portion of said first apertured collar means and said floating piston including a threaded recess for accepting said first connecting screw, and said second stop means includes a second apertured collar means secured to said floating piston and a second connecting screw having a head, said second connecting screw freely passing through the aperture of said second apertured collar means with said head abuttable against a portion of said second apertured collar means, said second end wall including a threaded recess for accepting said second connecting screw.

3. The tandem master brake cylinder apparatus of claim 2, wherein said first apertured collar means includes a flange against which said first spring abuts and a first stop seat abutting said flange and including a pin member and said first piston includes a guideway for accommodating said pin member, and said second apertured collar means includes a second flange against which said second spring abuts and a second stop seat abutting said second flange and including a second pin member and said floating piston includes a guideway for accommodating said second pin member.

References Cited by the Examiner

UNITED STATES PATENTS

| | | | |
|---|---|---|---|
| 2,157,733 | 5/39 | Sessions | 60—54.5 |
| 2,239,751 | 4/41 | Kritzer | 60—54.5 |
| 2,732,918 | 1/56 | Hackworth | 60—54.6 X |
| 3,117,421 | 1/64 | Stelzer | 60—54.6 |

FOREIGN PATENTS

| | | |
|---|---|---|
| 11,155,138 | 11/57 | France. |
| 1,048,169 | 3/56 | Germany. |

JULIUS E. WEST, *Primary Examiner.*

EDGAR W. GEOGHEGAN, *Examiner.*